United States Patent [19]

Hotchkiss

[11] 3,999,635
[45] Dec. 28, 1976

[54] DISC BRAKE CALIPER AND LINING CARRIER SUPPORTING MEANS

[75] Inventor: Marvin E. Hotchkiss, Troy, Ohio

[73] Assignee: The B. F. Goodrich Company, Akron, Ohio

[22] Filed: Oct. 6, 1975

[21] Appl. No.: 619,791

[52] U.S. Cl. .............................. 188/72.5; 188/73.6
[51] Int. Cl.² ...................................... F16D 55/224
[58] Field of Search .............. 188/73.3, 73.6, 72.4, 188/72.5, 72.1, 370, 72.6, 205, 206

[56] References Cited

UNITED STATES PATENTS

| 3,346,075 | 10/1967 | Swift | 188/73.3 |
| 3,387,687 | 6/1968 | Eggstein et al. | 188/73.3 X |
| 3,500,966 | 3/1970 | Birge | 188/72.4 |
| 3,889,785 | 6/1975 | Hori | 188/73.3 |

Primary Examiner—Trygve M. Blix
Assistant Examiner—Douglas C. Butler
Attorney, Agent, or Firm—William A. Shira, Jr.; Frederick K. Lacher

[57] ABSTRACT

A disc brake of the floating caliper type having a rotating disc between a pair of lining carriers. A torque plate on one side of the disc has arms extending radially outward to separate support members. The support members extend over the edge of the disc for supporting both the lining carriers and permitting axial sliding movement of the carriers into and out of braking engagement with the disc. The caliper is also independently supported and in sliding engagement with the support members at the ends of the arms so that during braking the torque is transmitted directly to either one or the other of the arms and the only forces acting on the caliper member are the brake actuation force in a direction axially of the disc and the caliper supporting force.

12 Claims, 8 Drawing Figures

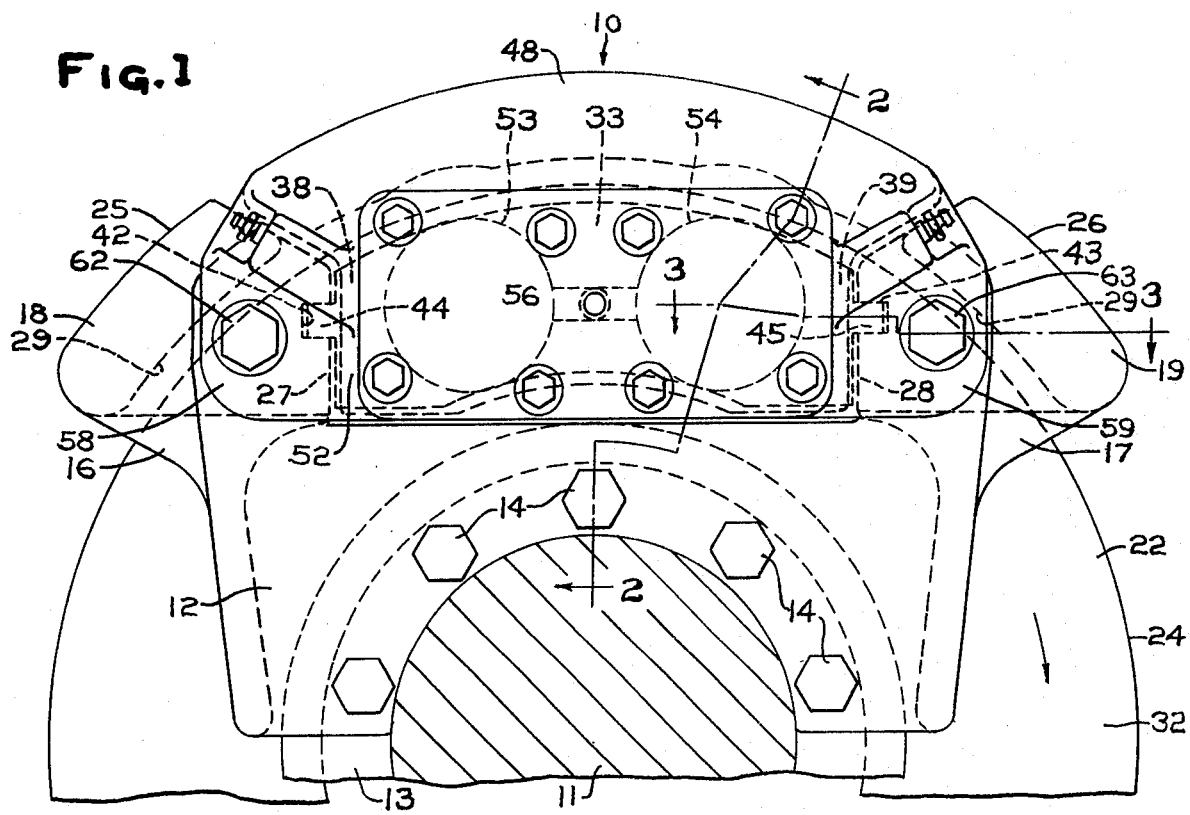
Fig. 1
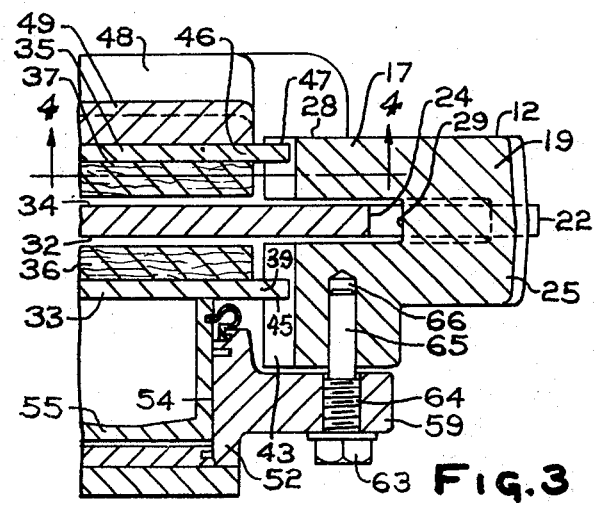
Fig. 2
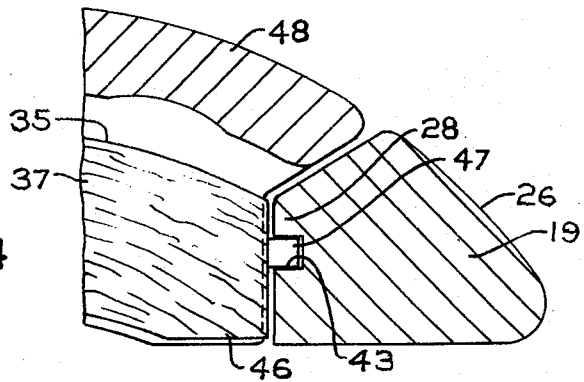
Fig. 3
Fig. 4

DISC BRAKE CALIPER AND LINING CARRIER SUPPORTING MEANS

BACKGROUND OF THE INVENTION

Heretofore there have been sliding caliper brake designs in which the lining carriers and caliper have been supported by spaced arms of a torque member and the caliper. These brakes have included mounting of the two lining carriers on one support member to distribute the torque load between the torque arms and have also used the caliper structure for transferring forces between the arms. Special clamping members have been required for these brakes to provide the required actuation. In heavy duty brakes such as those used for off-road vehicles, the transfer of torque forces through the caliper and the mounting of one lining carrier in a different manner than the other lining carrier may cause premature failure of the brake parts under the high torque loads which are developed. Furthermore, multipart mechanisms for clamping and force transmission present problems in assembly, disassembly and maintenance of heavy duty brakes.

SUMMARY OF THE INVENTION

The present invention provides a construction in which the lining carriers are supported by separate supporting members at each end of the carriers. Each supporting member is carried by a separate torque arm so that one arm will transfer substantially all the torque load from the lining carriers to the torque flange upon actuation of the brake with the disc rotating in one direction. Likewise, with the disc rotating in the other direction substantially all the torque load will be transferred by the other torque arm. The caliper member is slidably supported on the separate supporting members; however, the only forces acting on the caliper member are the brake actuation force in the axial direction generated by the piston-cylinder assembly of the caliper housing and the supporting force which is relatively small. Accordingly, the torque forces are transmitted directly from the lining carriers to the torque arms and the caliper member can be installed on and removed from the lining carrier in the radial direction. The lining carriers may also be installed and removed while the caliper member is removed providing a construction which has few parts and which may be manufactured and serviced with a minimum of labor.

BRIEF DESCRIPTION OF THE DRAWINGS

FIG. 1 is a fragmentary elevation of a caliper disc brake embodying the invention showing the piston-cylinder side of the caliper.

FIG. 2 is a sectional view taken along the planes of line 2—2 in FIG. 1.

FIG. 3 is a sectional plan view taken along the planes of line 3—3 in FIG. 1.

FIG. 4 is a sectional elevational view taken along the plane of line 4—4 in FIG. 3 to show the mounting of the lining carrier on the supporting member.

DETAILED DESCRIPTION

Figure 5:
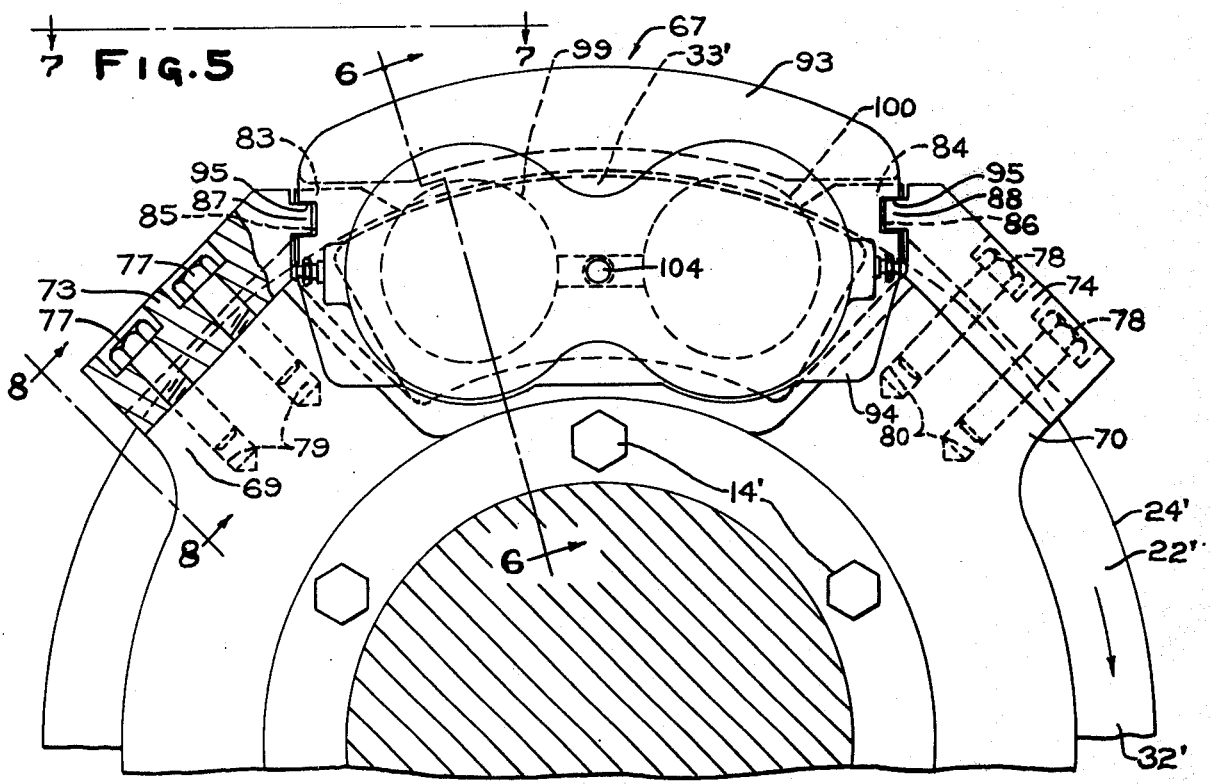
FIG. 5 is a fragmentary elevation of a modification embodying the invention with parts being broken away.

A disc brake assembly 10 is shown in FIGS. 1 and 2 for a vehicle having an axle 11 on which a wheel (not shown) may be rotatably mounted. A nonrotatable mounting member such as torque plate 12 is mounted on a flange 13 of the axle 11 by a series of bolts 14 and nuts 15 extending through holes in the flange spaced circumferentially around the axle.

The torque plate 12 has a pair of arms 16 and 17 extending radially outward from the axle 11 at circumferentially spaced-apart positions to separate support members such as extensions 18 and 19 extending axially of the axle.

A rotatable brake disc 22 which may be of steel or other wear-resistant material is carried by the wheel on an annular adapter 23, a portion of which is shown in FIG. 2, for rotation of the disc with the wheel. The brake disc 22 may be removably fastened to the adapter 23 by screws or similar fasteners (not shown). The brake disc 22 has an outer periphery 24 with a radius less than the radius of the outer portions 25 and 26 of the extensions 18 and 19 on the torque plate 12 so that the extensions may extend axially over the outer periphery of the disc. Radially inner portions 27 and 28 of the extensions 18 and 19, respectively, have a radius less than the radius of the outer periphery 24 of the brake disc 22 and therefore grooves 29 are provided in the extensions for the disc 22.

The brake disc 22 has opposite parallel faces with a first face 32 engageable with a first friction lining carrier 33 and a second face 34 engageable with a second friction lining carrier 35. The first friction lining carrier 33, which may be of steel, carries a friction lining 36 which is interposed between the first friction lining carrier and the first face 32. The second friction lining carrier 35 carries a friction lining 37 which is interposed between the lining carrier and the second face 34. The first friction lining carrier 33 has ends 38 and 39 supported by the extensions 18 and 19 of the torque plate 12. The extensions 18 and 19 have axially extending slots 42 and 43, respectively, and the first friction lining carrier 33 has circumferentially extending lugs 44 and 45 at the ends 38 and 39, respectively, for slidding engagement in the slots.

In a like manner, the second friction lining carrier 35 has ends 46 supported by the extensions 18 and 19. Circumferentially extending lugs 47 at the ends 46 of the second friction lining carrier 35 are slidably mounted in the slots 42 and 43 of the extensions 18 and 19 for axial movement of the friction lining carrier 35 into engagement with the disc 22. As shown in FIG. 3, the slot 43 is interrupted by the groove 29 in the extension 19 for the disc 22 and the slot 42 in the extension 18 is interrupted by the groove 29 in that extension.

A floating caliper 48 extends axially of the disc 22 and has a radially extending leg member or back leg 49 overlapping the second friction lining carrier 35. A housing 52 overlaps the first friction lining carrier 33 and contains cylinders 53 and 54. Pistons 55 are slidably mounted in the cylinders 53 and 54 for engagement with the first friction lining carrier 33. Openings in the ends of the cylinders 53 and 54 are connected to a nipple fitting 56 for a conduit (not shown) communicating fluid under pressure to the cylinders.

Flanges 58 and 59 on the housing 52 of the caliper 48 overlap the extensions 18 and 19 of the torque plate 12 and are supported on the extensions by supporting connections such as bolt studs 62 and 63. As shown more clearly in FIG. 3, each of the bolt studs 62 and 63 has a threaded portion 64 for threaded engagement with the flange 58 or 59 and a rod portion 65 extending axially of the disc 22 and axle 11 into an axially extending hole 66 in the extension 18 or 19. The supporting connection permits axial movement of the caliper 48 in a direction to the left, as shown in FIG. 2, to compensate for wear of the friction linings 36 and 37 of the friction lining carriers 33 and 35.

Disassembly of the brake assembly 10 is facilitated by unscrewing and removing the bolt studs 62 and 63. The caliper 48 may then be moved in an outwardly radial direction relative to the axle 11 and brake disc 22. This permits the first friction lining carrier 33 to be moved upward and the first friction lining carrier 33 to be moved downward, as shown in FIG. 3, out of the slots 42 and 43 for replacement by other friction lining carriers.

In operation, fluid pressure is communicated to the cylinders 53 and 54 through the nipple fitting 56 and the pistons 55 are urged into engagement with the first friction lining carrier 33. The caliper 48 is then urged to the left as shown in FIG. 2, and the back leg 49 moves the second friction lining carrier 35 towards the disc 22. The friction linings 36 and 37 engage the rotating disc 22 and the resulting torque is transmitted to extension 18 or extension 19 of the torque plate 12.

For example, when the brake disc 22 is rotating in a clockwise direction, as shown by the arrow in FIG. 1, the torque resulting from the engagement of the friction linings 36 and 37 with the disc is transmitted by the first friction lining carrier 33 and second friction lining carrier 35 to the extension 19 through the lug 45 at the end 39 of the first friction lining carrier and the lug 47 at the end 46 of the second friction lining carrier engaging the slot 43 in the extension 19. This torque force is transmitted directly to the arm 17 of the torque plate 12 and then to the flange 13 on the axle 11. In the event the brake disc 22 rotates in the counterclockwise direction, as shown in FIG. 1, the torque forces will be transmitted to the extension 18 and through arm 16 to the torque plate 12 for transmittal through the flange 13 on the axle 11.

During operation of the brake assembly 10, the caliper 48 transmits the brake actuation forces imposed by the pistons 55 and the only other forces acting on the caliper are the caliper supporting forces transmitted through the bolt studs 62 and 63.

Referring to FIGS. 5 through 8, a modification is shown in which a disc brake assembly 67 for a wheel rotatably mounted on an axle 11' has a torque flange 68 mounted on a flange 13' of the axle by bolts 14' and nuts 15' spaced circumferentially of the axle. The torque flange 68 has radially extending arms 69 and 70 at circumferentially spaced-apart positions on which support members such as axially extending bars 73 and 74 are mounted.

Figure 8:
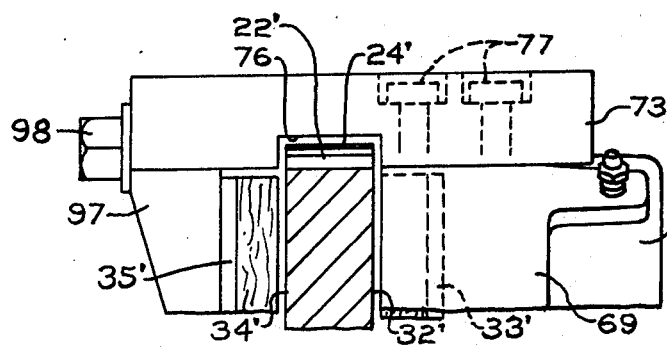
FIG. 8 is a fragmentary view taken along the plane of line 8—8 in FIG. 5.

A brake disc 22' is mounted on a wheel supported adapter 23' fastened as by screws 75 for rotation with the wheel (not shown). The disc 22' has a radially outer periphery 24' with the bars 73 and 74 extending over the outer periphery from the arms 69 and 70 of the torque flange 68. As shown in FIG. 8, the bars 73 and 74 may have grooves 76 to provide clearance for the movement of the disc 22'. The bars 73 and 74 may be fastened to the arms 69 and 70 by suitable means such as studs 77 and 78 threaded in holes 79 and 80 in the arms. The disc 22' has a pair of opposing faces with a first face 32' disposed for engagement by the lining of a first friction lining carrier 33' and a second face 34' disposed for engagement with the lining of a second friction lining carrier 35'. The ends 83 and 84 of the first lining carrier 33' are positioned adjacent the bars 73 and 74 and have slots 85 and 86 for sliding engagement with axially extending ribs 87 and 88 at the edges of the bars. The second friction lining carrier 35' likewise has ends 89 with slots 92 for sliding engagement with the ribs 87 and 88.

A caliper 93 having a housing 94 overlapping the first friction lining carrier 33' has axially extending slots 95 and 96 at each side of the caliper for sliding engagement with the ribs 87 and 88. A radially extending back leg 97 overlaps the second friction lining carrier 35' and may be fastened to the caliper 93 by studs 98. The housing 94 has cylinders 99 and 100 carrying pistons 103. The cylinders are connected to a nipple fitting 104 for connection to a conduit (not shown) communicating fluid under pressure to the cylinders.

To disassemble the brake assembly 67, the studs 77 of the bar 73 are removed whereupon the rib 88 can be removed from the arm 70 permitting the caliper 93 to be moved clockwise out of engagement with the rib 87 and then moved radially away from the disc 22', first lining carrier 33' and second lining carrier 35'. This permits removal of the first friction lining carrier 33' and second friction lining carrier 35' in the same manner so that they may be replaced. Disassembly may also be accomplished by removing the bar 74 in a similar manner.

Figure 6:
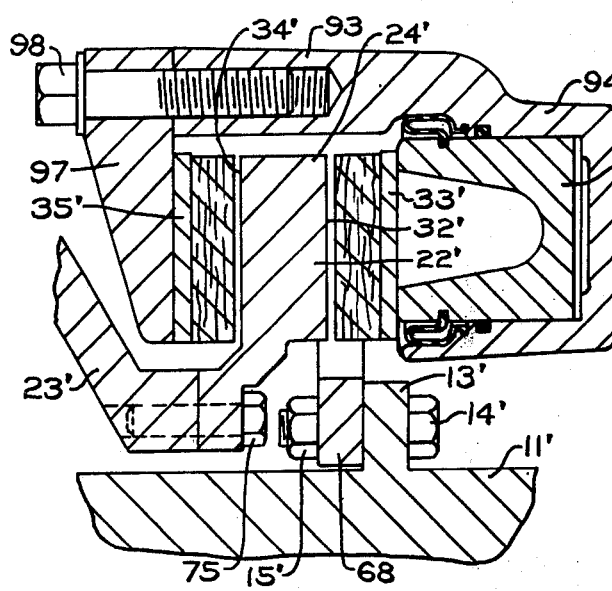
FIG. 6 is a sectional view taken along the planes of line 6—6 in FIG. 5.
Figure 7:
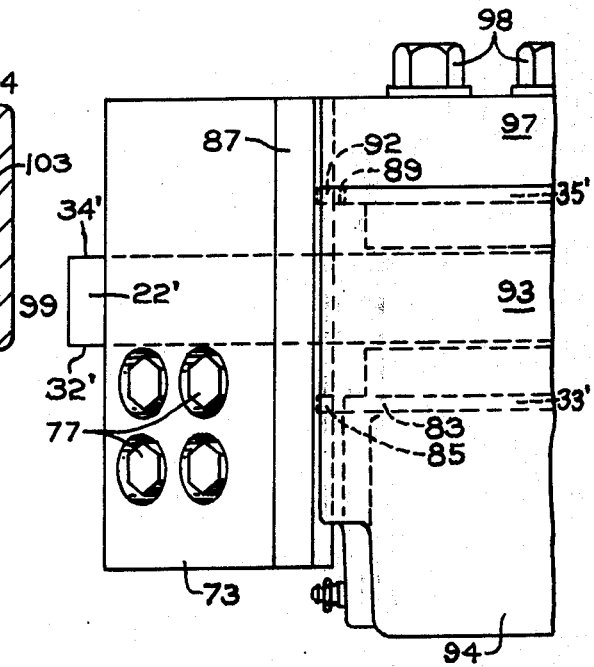
FIG. 7 is a fragmentary plan view taken along the plane of line 7—7 in FIG. 5.

In operation, when the disc 22' is rotating in the clockwise direction, as shown by the arrow in FIG. 5, fluid pressure is communicated to the cylinders 99 and 100 through the nipple fitting 104 and moves the pistons 103 into engagement with the first friction lining carrier 33', moving it and the friction lining to the left, as shown in FIG. 6, into engaement with the disc 22'. This causes the caliper 93 to move to the right urging the back leg 97 into engagement with the second friction lining carrier 35' and urging that carrier and the friction lining to the right, as shown in FIG. 6, into engagement with the second face 34' of the disc. As the friction linings wear, the caliper 93 the caliper will move to the right relative to the position shown in FIG. 6 and automatically adjust for wear as it slides on the ribs 87 and 88. The torque forces resulting from the engagement of the lining carriers 33' and 35' with the disc 22' will be transmitted through the rib 88 to the bar 74 and then through the studs 78 directly to the arm 70 of the torque flange 68. The only forces acting on the caliper 93 are the actuation forces in an axial direction resulting from the movement of the pistons 103 in the cylinders 99 and 100 and a supporting force exerted through the slots 95 and 96 of the caliper with respect to the ribs 87 and 88.

In the event the disc 22' is rotated in the counterclockwise direction, as shown in FIG. 5, the torque forces will be transmitted from the first friction lining carrier 33' and the second friction lining carrier 35' through the rib 87 to the bar 73. These forces will then be transmitted from the bar 73 through the studs 77 to the arm 69 of the torque flange 68.

The invention is capable of other modifications and adaptions by those having ordinary skill in the art and is more particularly defined by the appended claims.

I claim:

1. A brake assembly comprising a brake disc rotatable about an axis, said brake disc having a first face on one side and a second face on the opposite side, a first lining carrier disposed adjacent said first face of said disc, a second lining carrier disposed adjacent said second face of said disc, a nonrotatable mounting member having a pair of circumferentially spaced-apart arms extending in a generally radial direction relative to said disc, each of said arms having a separate support member extending axially over the outer peripheral edge of said disc, said first lining carrier and said second lining carrier being in sliding engagement axially of said disc with said support member of one of said arms at one end and with said support member of the other of said arms at the other end for transmitting torque forces upon actuation of said assembly, each of said support members having an axially extending slot and said first and second lining carriers having circumferentially extending lugs at each end in sliding engagement with said slots, a caliper member extending axially of said disc having a housing overlapping said first lining carrier and a radially extending leg member overlapping said second lining carrier, sliding connections between said caliper member and said support member of said one of said arms and between said caliper member and said support member of said other of said arms, said sliding connections between said support members and said caliper member including disconnecting means for removal of said caliper member from said lining carriers and said disc in a direction radially of said disc, said housing containing actuating means for urging said first lining carrier axially in one direction into braking engagement with said first face of said disc whereby said caliper including said leg member is urged axially in the opposite direction moving said second lining carrier into braking engagement with said second face of said disc, said torque forces resulting from braking engagement of said first and second lining carriers with said disc rotating in one direction being transmitted to one of said pair of arms and said torque forces resulting from braking engagement of said first and second lining carriers with said disc rotating in the opposite direction being transmitted to the other of said pair of arms.

2. A brake assembly according to claim 1 wherein each of said slots is interrupted by a groove in said support member for said disc providing a slot segment on one side of said disc for sliding engagement with one of said lugs of said first lining carrier and a slot segment on the other side of said disc for sliding engagement with one of said lugs of said second lining carrier.

3. A brake assembly comprising a brake disc rotatable about an axis, said brake disc having a first face on one side and a second face on the opposite side, a first lining carrier disposed adjacent said first face of said disc, a second lining carrier disposed adjacent said disc, a second face of said disc, a nonrotatable mounting member having a pair of circumferentially spaced-apart arms extending in a generally radial direction relative to said disc, each of said arms having a separate support member extending axially over the outer peripheral edge of said disc, said first lining carrier and said second lining carrier being in sliding engagement axially of said disc with said support member of one of said arms at one end and with said support member of the other of said arms at the other end for transmitting torque forces upon actuation of said assembly, said sliding engagement of said first lining carrier and said second lining carrier with said support member of each of said arms being provided by torque transmitting connections having circumferentially extending lug members in sliding engagement with axially extending slots, a caliper member extending axially of said disc having a housing overlapping said first lining carrier and a radially extending leg member overlapping said second lining carrier, sliding connections between said caliper member and said support member of said one of said arms and between said caliper member and said support member of said other of said arms, said housing containing actuating means for urging said first lining carrier axially in one direction into braking engagement with said first face of said disc whereby said caliper including said leg member is urged axially in the opposite direction moving said second lining carrier into braking engagement with said second face of said disc, said torque forces resulting from braking engagement of said first and second lining carriers with said disc rotating in one direction being transmitted to one of said pair of arms and said torque forces resulting from braking engagement of said first and second lining carriers with said disc rotating in the opposite direction being transmitted to the other of said pair of arms.

4. A brake assembly according to claim 3 wherein said sliding connections between said support members and said caliper member include disconnecting means for removal of said caliper member from said lining carriers and said disc in a direction radially of said disc.

5. A brake assembly according to claim 4 wherein said sliding connections include an axially extending rod member mounted in said caliper housing, and one of said support members having an elongated axially extending opening for receiving a projecting end of said rod member in sliding engagement.

6. A brake assembly according to claim 5 wherein said disconnecting means includes a threaded connection between said rod and said housing for removal of said rod from said housing and said support member.

7. A brake assembly according to claim 4 wherein said sliding connections include slots at each side of said caliper member and an axially extending bar connected to each of said support members and engaging said slots in said caliper member.

8. A brake assembly according to claim 7 wherein said disconnecting means includes fasteners between said bar and at least one of said support members and said fasteners being removable for removing said bar from the support member.

9. A brake assembly according to claim 4 wherein said first and second lining carriers have said axially extending slots at each side and support members include said lug members in the form of axially extending bars having edges in sliding engagement with said slots.

10. A brake assembly according to claim 3 wherein each of said support members has one of said axially extending slots and said first and second lining carriers have said circumferentially extending lugs at each end in sliding engagement with said slots.

11. A brake assembly according to claim 3 wherein said actuating means includes a piston-cylinder assembly carried by said housing and engageable with said first lining carrier.

12. A brake assembly according to claim 11 wherein said actuating means including a second piston-cylinder assembly engageable with said first lining carrier.

* * * * *